Figure 6:
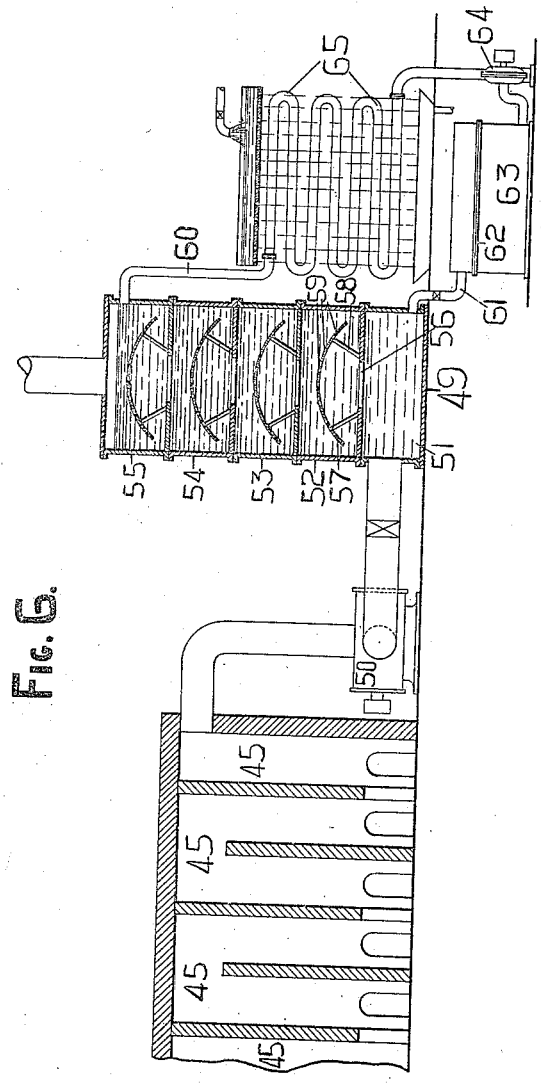

H. L. DOHERTY.
PROCESS FOR RECOVERING AMMONIA SALT FROM THE DISTILLATION GASES OF COAL.
APPLICATION FILED FEB. 15, 1910.
1,043,211.
Patented Nov. 5, 1912.
3 SHEETS—SHEET 1.
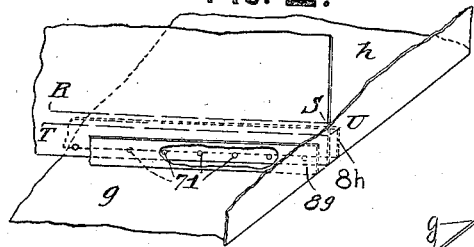
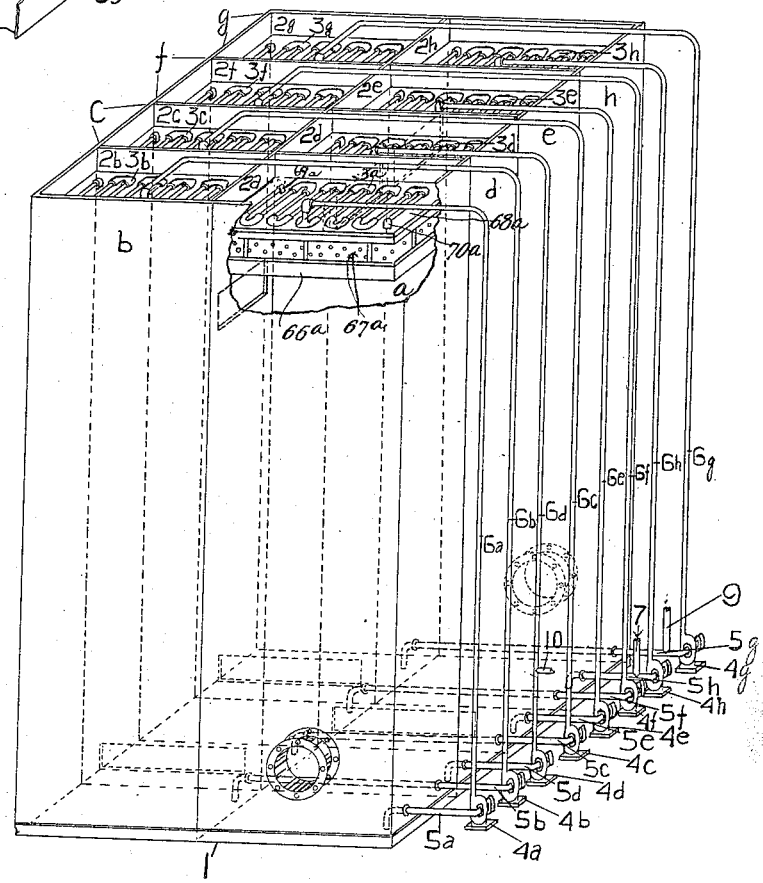
Witnesses:
L. G. Coleman.
Thos. J. Carter.
Henry L. Doherty, Inventor
By his Attorney Frank S. Young

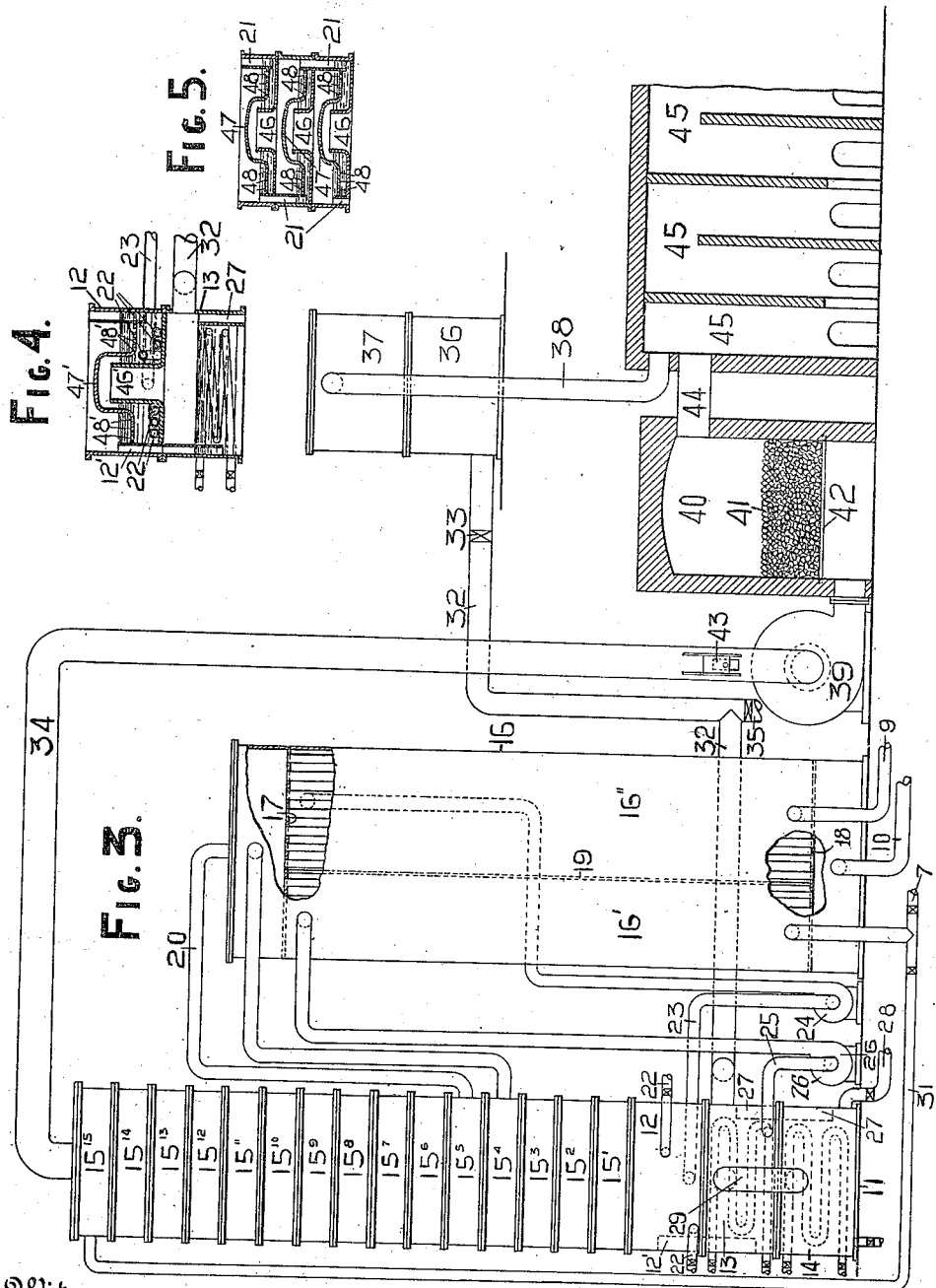

H. L. DOHERTY.
PROCESS FOR RECOVERING AMMONIA SALT FROM THE DISTILLATION GASES OF COAL.
APPLICATION FILED FEB. 15, 1910.

1,043,211.

Patented Nov. 5, 1912.

3 SHEETS—SHEET 3.

Witnesses:
L. G. Coleman
Thos. J. Carter

Henry L. Doherty, Inventor
By his Attorney Frank S. Young

UNITED STATES PATENT OFFICE.

HENRY L. DOHERTY, OF NEW YORK, N. Y.

PROCESS FOR RECOVERING AMMONIA SALT FROM THE DISTILLATION-GASES OF COAL.

1,043,211.  Specification of Letters Patent.  Patented Nov. 5, 1912.

Application filed February 15, 1910. Serial No. 544,095.

*To all whom it may concern:*

Be it known that I, HENRY L. DOHERTY, a citizen of the United States, and a resident of New York city, in the county of New York and State of New York, have invented certain new and useful Improvements in Processes for Recovering Ammonia Salt from the Distillation-Gases of Coal, of which the following is a specification.

My invention relates to a process for recovering ammonia salt from the distillation gases of coal, and, in particular, to such a process in which the ammonia is fixed by acids derived from constituents of the distillation gases formed contemporaneously with the ammonia itself.

This application relates to a modification of the process claimed in my co-pending application 544,094, filed Feb. 15th, 1910.

The object of my invention is to provide a process whereby the ammonia formed in the destructive distillation of the coal may be converted into a salt consisting, chiefly, of ammonium sulfite by means of sulfurous acid formed from the sulfur of the hydrogen sulfid, which is formed during the distillation of the coal, substantially contemporaneously with the ammonia.

In the usual manner of fixing the ammonia formed in the distillation or gasification of coal, the ammonia-bearing gases are conducted through a suitable chamber in which they are contacted with separately manufactured sulfuric acid, fixing the ammonia as ammonium sulfate. This product is used as the source of ammonia for various industrial purposes but chiefly as a fertilizer. By my method, I am able to fix the ammonia in a form that is just as available as the sulfate without the necessity of using any chemical reagents other than those obtained from the coal at the same time as the ammonia.

Briefly, my invention consists in absorbing the ammonia and hydrogen sulfid of the distillation gas in a partially purified ammonia liquor containing a substantial proportion of its ammonia in the free or hydrated condition, separately separating the hydrogen sulfid and the ammonia from said liquor, passing the hydrogen sulfid, in admixture with air, through an incandescent bed of iron oxid, mixing the sulfurous and sulfuric acids, so formed, and the ammonia to form a mixture of ammonium sulfite and sulfate, and recovering the ammonium salts.

In the accompanying drawings, I have shown, in diagrammatic form, an arrangement of apparatus suitable for applying my invention.

Figure 1 is a perspective view of the gas cooling and scrubbing apparatus. Fig. 2 is a detail of the same showing how the scrubbing liquor passes from compartment to compartment of said apparatus. Figs. 3 and 6 taken together show a diagrammatic elevation of the apparatus for separating the ammonia and sulfur gases from the scrubbing liquor and making the fixed ammonia salts therefrom with the heat interchanger shown in part section. Fig. 4 is a vertical diametral section through the upper heating chamber of the purifying still. Fig. 5 is a vertical diametral section through three of the sections of the purifying still.

In the drawings, 1 is the absorption apparatus. This is divided into a plurality of compartments, $a$, $b$, $c$, $d$, $e$, $f$, $g$ and $h$, in the design shown, each compartment having located above it a compartment ($2_a$, $2_b$, $2_c$, etc., respectively,) in which is a cooling coil ($3_a$, $3_b$, etc.) through which the liquid, used in the compartment to wash the gas, is passed for the purpose of cooling it before introducing it into the compartment in contact with the gas. The cooling is performed in the apparatus shown, by the circulation of a cooling liquid around the coils in the compartments 2. Circulating pumps, $4_a$, $4_b$, etc., maintain a constant circulation of liquor from the bottoms of the compartments to the respective cooling coils. After passing through the coils 3, the liquid passes through some suitable distributing device which should secure a uniform distribution of the liquid across the cross-section of the compartment. In Fig. 1 is shown a part perspective of the distributing device for chamber $a$. This distributing device comprises a tray $66_a$, having a perforated bottom $67_a$. The aggregate area of the perforations should be such relative to the volume of liquor circulating that there will always be a substantial depth of liquor on the bottom $67_a$ of the tray $66_a$. Any ordinary variation in the rate of circulation of the liquor is automatically taken care of by the increased rate at which the liquor passes through $67_a$ with the increase in head of liquor in $66_a$ and, vice versa, by the diminution of flow with the fall of head in $66_a$.

The sheet $68_a$ forms the top of compartment $a$ and at the same time the bottom of the cooling compartment $2_a$. As shown, the liquor enters the middle portion of the coil $3_a$ and flowing each way discharges through the connections $69_a$ and $70_a$ onto the distributing tray $66_a$, and thence passes through the perforations of the bottom $67_a$ into the chamber $a$. The method of distribution of the scrubbing liquid is the same in all of the compartments. These compartments, $a$, $b$, $c$, etc., generally contain a structure of grids or trays over the surface of which the liquid finds its way to the bottoms of the compartments. The surface of the grids (or whatever form of filling is used) is thus kept continually wetted. The gas passes through the interstices of the grid structure and is thus brought into intimate contact with the scrubbing liquid.

In compartment $h$, the gas which, here, should contain only a trace of $NH_3$ and the acid gases $H_2S$ and $CO_2$, is subjected to scrubbing by a portion of previously formed ammonia liquor which has been freed, in the manner hereinafter described, from substantially all of its volatilizable compounds. The extent to which it is necessary to remove the volatilizable gases from this portion of the liquor depends, in great measure, upon the temperature that prevails in $h$. While ammonia has a considerable affinity for water, even weak solutions of $NH_3$ in water possess an appreciable vapor tension at ordinary temperatures. It is necessary that the liquor used for scrubbing in $h$ should have a vapor tension of its $NH_3$ less than the tension of the small quantity of $NH_3$ in the gas passing through compartment $h$. Usually the final traces of $NH_3$ are removed from the gas by scrubbing with fresh water. By my method, however, I prefer to use liquor that has been freed from its volatile ammonia in order to avoid the dilution of the liquor that is occasioned by the use of fresh water. The liquor in $h$ is maintained in circulation by pump $4_h$, as already explained. A portion of this liquor, corresponding to the volume of fresh liquor introduced through pipe 7, overflows to compartment $g$ through the sealing device, shown on an enlarged scale in Fig. 2, and mixes with the liquor circulating in compartment $g$.

The sealing device shown is formed by two baffles $8_h$ and $8_g$ respectively, spaced away from the wall dividing $h$ and $g$. The lower part of the dividing wall is pierced with numerous apertures 71. Under normal conditions of working the liquor level in the bottom of compartment $h$ would be at a considerable height above the baffles $8_h$ and $8_g$—say at the level R S. Since in normal working a portion of the liquor is constantly withdrawn from one of the compartments ($d$ for example) the level of liquor in this compartment tends to fall. This causes a flow of liquor from the next communicating compartment $e$ through a sealing device similar to the one described above, which, in turn, causes a flow of liquor from $f$ to $e$ and so on. Owing to the friction of the gas passing through the compartments and the connecting ports there is a slight graduated fall in pressure at a given level in each of the compartments from $a$ to $h$. For this reason, the difference in level of the liquor between any two adjacent compartments is greater than that which would be required to produce the necessary flow of liquor from compartment to compartment were the gas pressures in the adjacent compartments equal. This is indicated by the spacing of the lines R S and T U which may be taken to indicate the liquor levels in $h$ and $g$ respectively.

The liquor is introduced to $g$ by the pipe 9 connected, in the arrangement shown, to the suction pipe $5_g$ of pump $4_g$, and is circulated in the manner described, a volume of liquor corresponding to the overflow from $h$ and the quantity of treated liquor introduced through 9, overflowing to compartment $f$. The liquor flows in this way from compartment to compartment, a volume being maintained in circulation in each compartment much greater than the volume of the flow from compartment to compartment. The volume of liquor supplied through the pipes 7 and 9 depends, in great measure, upon its content of free ammonia. It is necessary to introduce in the liquor the quantity of free ammonia that will suffice, in connection with the ammonia already present in the gas, to form sulfid and carbonate, respectively, with the $H_2S$ and $CO_2$ of the foul gas. When the proper quantity of free ammonia is supplied in the liquor, substantially all of the $H_2S$, $CO_2$ and $NH_3$ is removed from the foul gas. In my preferred method of working, I withdraw the liquor bearing the $H_2S$, $CO_2$ and $NH_3$ from compartment $d$ through pipe 10 and run it to the ammonia sulfid recovery plant. This is shown diagrammatically in Figs. 3 and 6.

11 is the still in which the impurities removed from the gas are separated from the liquor, and about half of the ammonia in the latter again converted to the free or hydrated condition. 11 has, in its lower portion, three chambers or retorts, 12, 13 and 14. Upon the uppermost of these chambers 12, is built up the still proper. This is composed of a plurality of sections, $15^1$, $15^2$, $15^3$, etc., arranged as shown in Fig. 5.

16 is a heater-cooler, consisting of a cylindrical tank having an upper and lower tube-sheet (17 and 18, respectively) with tubes 72 supported thereby. The chamber included between the tube sheets is divided by partition 19 into two compartments, 16' and 16''. The liquor passing through pipe 10, which contains the $NH_3$, $H_2S$ and $CO_2$ absorbed from the gas, enters 16 below the tube-sheet 18, and passes up through the tubes 72 to the space above the upper tube sheet 17. During its upward passage through the tubes, the liquor is heated by two streams of hot liquor passing in the contrary direction through the compartments 16' and 16''. Now the ammonium sulfid and ammonium carbonate begin to dissociate at about 98° and 124° Fah., respectively. Therefore in passing through 16 the ammonium salts of the foul liquor are partially dissociated with the evolution of $H_2S$ and $CO_2$. These reactions are endothermic in character and there is, therefore, a considerable quantity of heat rendered latent during the passage of the foul liquor through the heater-cooler. This heat absorption increases the thermal capacity of the foul liquor and thus increases the efficiency of heat recuperation from the hot purified liquor. The gases evolved from the liquor in the course of this heating discharge from 16 through the pipe 20 into one of the sections ($15^5$ as shown) of still 11. The heated liquor from 16 enters one of the sections ($15^4$ as shown). The section at which the foul liquor is introduced should be selected so that the gases passing through that section have a temperature but little above that of the foul liquor itself. From $15^4$ (or any other section at which it is entered) the liquor flows from section to section through the sealed overflow passages 21 into the upper heating chamber 12. As the liquor passes through the sections $15_r$ it is subjected to the action of the hot gases discharging from the compartment 12, which pass through the gas passages 46 under the hood 47 and then pass through the perforations 48 in the submerged portion of the hood. In bubbling through the sealing liquor in the different sections, the hot gases give up part of their heat to the foul liquor, still further increasing its temperature and dissociating still more of its ammonium salts. The liberated $H_2S$ and $CO_2$ separates from the liquor and joins the gaseous current passing through the still. The dissociation of the ammonium salts is a material aid in the cooling of the foul gases. The ammonia liberated in the dissociation of the salts is in great part retained in the liquor, since its coefficient of absorption is many times that of $H_2S$ and $CO_2$ at the temperature prevailing in 11. In the heating chamber 12, the liquor is heated to a temperature several degrees below its boiling point under the pressure prevailing in 12 by the steam coil 22. The specific temperature to which I heat the liquor in 12 depends upon the pressure conditions prevailing, the capacity of the still with reference to the gas washer, etc. Usually, I aim to maintain in 12 a temperature of from 6 to 12 degrees below the boiling point of the liquor under the pressure obtaining in 12. This pressure depends, of course, upon the altitude of the locality in which the treatment is carried out and upon the back pressure caused by the seals in the sections of the still. If the barometric pressure in 12 is about 25.9 inches of mercury, I would, preferably, maintain the temperature in 12 at about 197° to 198° Fah., as nearly as may be, while at a barometric pressure of say 31.3 inches in 12, I would, preferably, heat the liquor therein at a temperature of about 204° to 206° Fah. At this temperature the ammonium salts are very rapidly dissociated, the $H_2S$ and $CO_2$ liberated being immediately evolved while the liberated ammonia is for the great part retained in the liquor owing to the relatively great coefficient of absorption of water for ammonia as compared with those for $H_2S$ and $CO_2$. What ammonia is driven off from the liquor in 12 is re-absorbed in the current of foul liquor entering the still and in the special wash liquor introduced into the upper section of the still as hereafter described, and is thus constantly returned in the liquor current entering 12. In my preferred method of working, the liquor discharging from 12, will have had from 50 to 60 per cent. of its $H_2S$ and $CO_2$ eliminated with a reduction in its percentage of ammonia of only about 8%. This liquor will therefore have from 50 to 60 per cent. of its ammonia in the free or hydrated condition. The liquor discharging from 12 is divided into two sections. The main stream is drawn off from 12 through pipe 23 and forced by pump 24 to the top of compartment 16'' of heater-cooler 16. The other stream is permitted to pass through the overflow 12' into the boiling compartment 13. The proportion of free ammonia in the liquor discharging from 12 may be increased, but at the expense of the production of a weaker liquor. Therefore I have found that the method of working outlined gives the most economical results.

In compartment 13, the portion of the liquor which passes thereinto is subjected to active boiling until the $NH_3$, $CO_2$ and $H_2S$ have been completely driven off. The gases evolved in 13 together with those evolved in retort 14 as described below, are divided into two streams. The larger stream is drawn off from 13 through the pipe 32 as described below. The excess, if any, over this first portion passes through the vapor passage 46' in the bottom of 12 under the hood 47', depresses the level of liquid under the hood 47' until the perforations 48'' in the flange portion of 47' are unsealed, passes through these perforations and bubbles up through the liquor in 12. As the temperature of the liquor in 12 is considerably below the boiling point part of the $NH_3$ of this gaseous stream is absorbed by the liquor in 12, but the $CO_2$ and $H_2S$ pass through without being absorbed. The unabsorbed gases together with the gases evolved from the liquor in 12 pass up through the vapor passage 46 in the bottom of section 15′ under the hood 47, depress the level of the liquid under the hood until the perforations 48 in its flange portion are unsealed, through the perforations and bubble up through the liquor in 15′, thence through the sections above in the same manner. The boiled liquor discharging from 13 is subdivided into two streams, one being drawn off through pipe 25 and raised by pump 26 to the top of compartment 16′. The other subdivision of the liquor passes through the overflow 27 into the liming compartment 14. The liquor leaving 13 contains only the fixed salts of ammonia—sulfate, chlorid, etc. The proper quantity of milk of lime is run into 14, through the pipe 28 to combine with the acid of the fixed ammonium salts and liberate the $NH_3$. This latter passes up through the pipe 29 into the vapor space of 13, and joins the gaseous current discharging from 13. The liquor discharging from 14, which has been freed from all its ammonia, both volatile and fixed, is permitted to run to waste.

The cooled liquor discharging from compartment 16′ is divided into two streams. One of these streams passes directly to the circulating pump of compartment $h$, through the pipe 7, while the smaller stream is conducted to the uppermost section $15^{15}$ of the still 11 through the pipe 31. Overflowing from $15^{15}$ through the sealed overflow passage it passes into the section $15^4$ and thence downward through the different sections to section $15^4$, where it mingles with the foul liquor entering that section. The gases passing up through the still are subjected to scrubbing by the descending liquor, all of their contained $NH_3$ being absorbed, while the bulk of the $H_2S$ and $CO_2$ passes through unabsorbed, and discharges from the still through the pipe 34.

The gases from 13 and 14 are relatively strong in ammonia. The gas from 14 is composed almost entirely of ammonia and steam, while the ammonia constitutes nearly one-half of the fixed gases evolved in 13. The gases from these two compartments, after condensation, are therefore very strong in ammonia. Therefore, I prefer to remove from the system, at this point, its increment in ammonia. I withdraw from 13 through the pipe 32 the proportion of its vapors which carry a quantity of ammonia corresponding to the ammonia increment of the system, and lead them to the purifiers 36 and 37, which are charged, respectively, with iron oxid and lime. The pipe 32 should be cooled to cool the gases and condense the water vapor present, the condensed liquid being returned to the compartment 13 through the pipe 32, by gravity; or a cooling coil (not shown) may be introduced on 32 between 13 and 36. The gases from 32 pass through the purifiers 36 and 37 and the hydrogen sulfid and carbon dioxid are here separated from the ammonia. The pure ammonia passes through the pipe 38 to join the treated effluent gases from 11 in the condensing chamber 45. The effluent gases from the still 11, pass through the pipe 34 to fan 39. From 39 the gases pass to the oxidizing chamber 40, in which is a bed of iron oxid (or other suitable material) 41, supported by bars 42. This must initially be heated to nearly low redness but, after the reaction has been started, the heat developed is sufficient to maintain the temperature of the oxid. Through the damper 43, air is drawn into the gases by the suction of fan 39 and the mixed still gases ($CO_2$, $H_2S$, N, etc.), together with the air, passed through the bed of oxid in 40. The $CO_2$ is unchanged, but the $H_2S$ is decomposed by the iron oxid in the presence of air with the formation of $H_2O$ and $SO_2$, chiefly, and some $SO_3$. The effluent gases from 40 pass through the conduit 44 to the condensing chambers 45. Here they mix with the ammonia entered through the pipe 38. The $SO_2$ and $SO_3$ having a greater affinity for the ammonia than the $CO_2$, the ammonia combines with the sulfur acids and water to form a mixture of sulfite, bisulfite and sulfate, the first greatly predominating in quantity. The ammonium salts form fume in the hot gases at the entrance to 45, which is gradually deposited as the gases find their way through the chambers. If the sulfur oxids are present in quantity equivalent to the ammonia, or in greater proportion, the ammonia is converted almost completely into sulfur compounds. When, however, there is a deficiency of sulfur and the temperature in the condenser 45 is sufficiently low (below 120° Fah.) there is formed more or less of a carbonated salt of ammonia, of a composition corresponding to the commercial salt known as sesquicarbonate of ammonia. This condition seldom occurs in the case of distillation gases from coal but will sometimes be met with in the case of producer gas. When the deficiency of sulfur compounds is considerable I find it advisable to introduce an auxiliary condenser, 49, into which the gases from 45 are forced by blower 50. This auxiliary condenser may be of any suitable type and, as shown, is a common form of absorption tower used in the soda industry. It consists of a number of superimposed sections, 51, 52, 53, etc., the section 51 being simply an open cylindrical chamber. The other sections are alike in construction, each has an opening, 56, in its bottom, over which but not in contact with the bottom is a dome-shaped plate 57. This is supported on spiders 58 and has perforations 59. Mother liquor saturated with sesquicarbonate of ammonia is supplied to the top of 49 from the pipe 60. The gases pass up through the sections bubbling through the dome-shaped distributers 57 and the liquor in the condenser. The ammonia combines with part of the $CO_2$ of the gases and is taken up by the liquor. As this is at the saturation point a carbonated salt of ammonia crystallizes out. The crystals work down with the liquor through the openings 56 and are withdrawn from 49 with the liquor through the pipe 61. The liquor discharges on a screen, 62, in the upper part of tank 63, on which the crystals are intercepted and may be removed at intervals. The strained mother liquor is drawn off from the bottom of 63, by circulating pump 64, and forced through the cooling coil 65 and pipe 60 to the top of 49 to be again passed through. Usually the water vapor that is carried into the condenser 45 by the gases from 40 will suffice to form the crystalline salts of ammonia. When there is a deficiency of sulfur compounds, however, the salt crystallizing in 49 will fix some of the water of the mother liquor. It is generally necessary, therefore, to add water to the liquor from time to time.

The method of scrubbing the crude gas, which is herein described, is not claimed in this application, specifically, as it is claimed in another copending application, filed herewith.

Having described my invention, what I claim is:—

1. The process of converting easily decomposable ammonium compounds comprising sulfur compounds of ammonia into more stable salts which comprises decomposing the said ammonium compounds by means of heat to form free ammonia and gases comprising hydrogen sulfid, separating ammonia from the gases containing hydrogen sulfid, mixing oxygen-containing gas with the said hydrogen-sulfid-containing gases, passing the resulting mixture in contact with a catalytic material maintained at the proper temperature for reaction and mixing the previously separated ammonia with the gases resulting from the contact of the said gas mixture with the said catalytic material.

2. The process of converting mixed ammonium sulfids and carbonates into more stable salts, which comprises decomposing the said compounds by means of heat to form free ammonia and hydrogen-sulfid-containing gases, separating liberated ammonia from the hydrogen-sulfid-containing gases of the said compounds, oxidizing sulfur compounds of the said hydrogen-sulfid containing gases and mixing the previously separated ammonia with the oxidized sulfur compounds, whereby a mixture of ammonium salts of sulfur-oxygen acids is formed.

3. The process of converting mixed ammonium sulfids and carbonates into more stable salts which comprises decomposing the said compounds by means of heat to liberate ammonia and acid gas, separating the liberated ammonia from the acid gases of the said compounds, oxidizing the hydrogen sulfid of the said acid gases in most part to sulfur dioxid and adding the previously separated ammonia to the sulfur dioxid and free carbon dioxid, whereby a mixed salt of oxidized sulfur compounds of ammonia is formed.

4. The process of converting ammonium sulfids into oxidized sulfur salts of ammonium which comprises, decomposing the said ammonium sulfids by heating the same to liberate ammonia and hydrogen sulfid, separating the liberated ammonia from the liberated hydrogen sulfid, oxidizing the said hydrogen sulfid to sulfur dioxid and sulfur trioxid, mixing with the oxidized sulfur gases the previously separated ammonia and cooling the mixture down to the point of solidification of ammonium sulfite, whereby a mixture of ammonium sulfite and sulfate is formed.

5. The process of converting mixed ammonium sulfids and carbonates into more stable salts, which comprises decomposing the said compounds by means of heat to liberate ammonia, hydrogen sulfid and carbon dioxid, separating the liberated ammonia from hydrogen sulfid and carbon dioxid of the said compounds, oxidizing said hydrogen sulfid to sulfur-oxygen compounds and water, mixing the resulting gases with said separated ammonia, and cooling the resulting mixture below the point of solidification of the resulting ammonia salts, whereby a mixture of ammonium salts of sulfur-oxygen acids is obtained.

6. The process of making ammonium salts from gas containing ammonia and hydrogen sulfid which comprises separating the ammonia and hydrogen sulfid from said gas, separating the hydrogen sulfid from said ammonia, adding sufficient oxygen to said hydrogen sulfid to convert the same into sulfur dioxid and water, passing the said mixture of hydrogen sulfid and oxygen through a bed of metallic oxid maintained at a reactive temperature, whereby the said hydrogen sulfid is converted to sulfur dioxid and water, mixing the separated ammonia with the so-formed sulfur dioxid and water and condensing the ammonium sulfite formed.

7. The process of making ammonium salts from gas containing ammonia and hydrogen sulfid which comprises separating the ammonia and hydrogen sulfid from said gas, separating the hydrogen sulfid from said ammonia, adding sufficient air to said hydrogen sulfid to oxidize the same to sulfur dioxid and water, passing the mixture of air and hydrogen sulfid in contact with a catalytic material capable of causing the oxygen of the gaseous mixture to combine with the hydrogen sulfid of the same, whereby a sulfur-dioxid-bearing gas is obtained, mixing the separated ammonia with said sulfur-dioxid-bearing gas and condensing the ammonium sulfite formed.

8. The process of making ammonium salts from crude coal gas which comprises contacting said gas with a liquor containing free ammonia, whereby the ammonia and sulfur contained in said gas are absorbed by said liquor, withdrawing said liquor from contact with said gas, subjecting said liquor to heating, whereby ammonia and hydrogen sulfid are evolved from said liquor, absorbing the evolved ammonia in a liquid, withdrawing said liquid from contact with said hydrogen sulfid, subjecting said liquid to heating to liberate said ammonia, oxidizing said hydrogen sulfid to form oxids of sulfur and water, and mixing the said liberated ammonia with said oxids of sulfur to form fixed ammonium salts.

9. The process of making ammonium salts from crude coal gas which comprises contacting said gas with a liquor containing free ammonia, whereby the ammonia and acid components of the said gas are absorbed by said liquor, to form foul liquor, withdrawing said foul liquor from contact with said gas, subjecting said foul liquor to heating, whereby a portion of the ammonium salts in said liquor are dissociated with the elimination from said liquor of a major proportion of its acid constituents and a minor proportion of its ammonia, to form purified liquor, cooling the major portion of said purified liquor and using it to scrub the ammonia and acid components from a fresh portion of crude coal gas, subjecting the minor portion of said purified liquor to boiling to distil off substantially all of its volatilizable gases, subdividing the boiled minor portion of said purified liquor into two streams, cooling both of said streams, contacting the cooled liquor of one of these streams with another portion of crude coal gas after the latter has been scrubbed by said purified liquor, contacting the cooled liquor of the second of said streams with the gases eliminated from said foul liquor, whereby the minor portion of the ammonia eliminated from the said foul liquor is removed from said gases, withdrawing said second stream from contact with the residual gases, subjecting said second stream to boiling to free its absorbed ammonia, mixing oxygen with said residual gases, contacting such mixture with a catalytic material to oxidize the sulfur compounds in the mixture, adding to the so-formed gaseous mixture the ammonia freed from said second stream of liquor, and subjecting the mixed gases resulting from such addition of ammonia to cooling, whereby fixed ammonia salts are recovered.

10. The process of making ammonium salts having a major proportion of ammonium sulfite from crude coal gas, which comprises contacting said gas with a purified liquor containing free ammonia, whereby the ammonia, the hydrogen sulfid, and other impurities of the crude gas are absorbed by said liquor to form foul liquor, withdrawing said foul liquor from contact with said gas, subjecting said foul liquor to heating by hot purified liquor, further heating said foul liquor at approximately 198° Fah. until a major portion of the ammonium salts of said liquor are dissociated with the elimination from said liquor of the major portion of its acid components and a minor portion of its ammonia, to form a purified liquor, cooling the major portion of said purified liquor by said foul liquor, and using it to scrub the ammonia, hydrogen sulfid and other impurities from a fresh portion of crude coal gas, subjecting the minor portion of said purified liquor to boiling to distil off substantially all of its volatilizable gases, contacting such distilled gases with another portion of purified liquor, and adding the unabsorbed portion of such distilled gases to the gases eliminated from another portion of said foul liquor, subjecting a fraction of the boiled minor portion of said purified liquor to further boiling with lime to expel its fixed ammonia, adding the ammonia so expelled to the ammonia distilled from the minor portion of said purified liquor, subdividing the residual portion of the boiled minor portion of said purified liquor into two streams, cooling both of said streams, contacting the cooled liquor of one of these streams with another portion of crude coal gas after the latter has been scrubbed by said purified liquor and then adding the stream to the purified liquor to be used to scrub a fresh portion of crude gas, contacting the cooled liquor of the second of said streams with the gases eliminated from another portion of foul liquor, whereby the minor proportion of its ammonia eliminated from said foul liquor is removed from said gases, withdrawing said second stream from contact with the residual gases, subjecting said second stream to boiling to free its absorbed ammonia, and purifying said ammonia, mixing a sufficient proportion of air with said residual gases to oxidize somewhat more of the hydrogen sulfid of said residual gases than the proportion equivalent to the ammonia freed from said second stream, contacting said mixture of residual gases and air with oxid of iron maintained at an incipient red heat, whereby a somewhat greater proportion of sulfur oxids are formed than that equivalent to the ammonia freed from said second stream, mixing the gaseous mixture obtained by contacting the residual gases and air with the iron oxid, with the ammonia freed from said second stream, cooling such mixture and recovering the mixture of ammonium sulfite and sulfate so formed.

Signed at New York city in the county of New York and State of New York this 12th day of February A. D. 1910.

HENRY L. DOHERTY.

Witnesses:
 L. G. COLEMAN,
 THOS. I. CARTER.